United States Patent [19]

Parker et al.

[11] Patent Number: 4,571,350

[45] Date of Patent: Feb. 18, 1986

[54] METHOD FOR DEPOSITING THIN, TRANSPARENT METAL OXIDE FILMS

[75] Inventors: Edwin H. Parker, LaGrange, Ky.; Giacomo J. Piazza, Elmira, N.Y.

[73] Assignee: Corning Glass Works, Corning, N.Y.

[21] Appl. No.: 653,156

[22] Filed: Sep. 24, 1984

[51] Int. Cl.[4] .................... C03C 17/245; B05D 5/12; B05D 5/06

[52] U.S. Cl. ................................. 427/109; 427/160; 427/164; 427/166

[58] Field of Search ................ 427/109, 160, 164, 166

[56] References Cited

U.S. PATENT DOCUMENTS

| | | | |
|---|---|---|---|
| 3,331,702 | 7/1967 | Dates et al. | 427/109 |
| 4,123,244 | 10/1978 | Leclercq et al. | 427/109 X |
| 4,125,391 | 11/1978 | Van Laethem | 427/109 X |
| 4,293,594 | 10/1981 | Yoldas et al. | 427/109 X |

*Primary Examiner*—James R. Hoffman
*Attorney, Agent, or Firm*—C. S. Janes, Jr.

[57] ABSTRACT

This invention is directed to a method for producing thin, transparent metal oxide films of very uniform thickness through the pyrolysis of a metal salt which comprises spraying an atomized mist of the metal salt into a fuming chamber operating at a sufficiently high temperature to vaporize the mist and then drawing the fumes out of said chamber into contact with the surface of a substrate which is at a temperature essentially equivalent to that of the fumes at the exit end of said chamber, that temperature being sufficiently high to thermally decompose said metal salt and deposit a film of metal oxide on the substrate.

4 Claims, 2 Drawing Figures

METHOD FOR DEPOSITING THIN, TRANSPARENT METAL OXIDE FILMS

BACKGROUND OF THE INVENTION

This invention is directed to an improved deposition method for applying thin, transparent metal oxide films onto glass substrates. In particular, the invention contemplates the deposition of transparent conductive metal oxide coatings of uniform thickness on glass substrates wherein the electrical resistivities of the coatings can be carefully controlled over a wide range. In the preferred embodiment of the inventive method, antimony-doped tin oxide films of uniform thickness having optical transmissions over 80% and electrical resistivities ranging between about 7–1000 ohms/square can be prepared.

Metal oxide films produced through the pyrolysis of a wide variety of metal salts are well known to the art. Suitable materials and mixtures for forming electrically conducting metal oxide films include the chlorides, bromides, iodides, sulfates, nitrates, oxalates, and acetates of tin, indium, and cadmium, and various combinations of tin and antimony, tin and indium, and tin and cadmium. Optionally, a similar hydrolyzable salt or other compound of a modifying metal such as zinc, iron, copper, or chromium may also be included. For a fuller discussion of such films, their formation, and their characteristics, reference is made to U.S. Pat. Nos. 2,546,706 and 2,546,707.

Basically, the conventional process for preparing metal oxide films through pyrolysis has contemplated heating a substrate, such as a sheet of glass, to a temperature commonly within the range of about 400°–700° C., and then exposing a surface of the heated substrate to a metal salt which decomposes under the influence of the heated surface to form a continuous adherent metal oxide film thereon. Customarily, the filming material is sprayed onto the heated surface in the form of vapors or an atomized solution carried by a stream of air.

The process is quite dependent upon physical timing and individual technique. More importantly, the thickness of the deposited film is not uniform. Furthermore, where very thin glass sheet comprises the substrate, thermal gradients resulting from the spraying causes warpage thereof, thereby exaggerating thickness variations in the deposited film.

Applications such as heater panels and common resistors do not demand critical control of deposition thickness, but with the development of gas discharge, electrochromic, electroluminescent, and liquid crystal display devices, there is the need for thin, transparent conductive films of exceedingly fine uniformity of thickness. For flat display systems, uniformity of film thickness is vital. Hence, under optimum conditions those films demonstrate essentially no light absorption loss, but scattering and reflection losses can be significant due to nonuniformity of thickness.

Therefore, the primary objective of the instant invention is to develop a method for preparing thin, transparent conductive metal oxide films of exacting uniform thickness through pyrolysis of metal salts. More particularly, it is an objective of the subject invention to produce, by pyrolysis, antimony-doped, tin oxide films of uniform thickness within the range of about 1000–3000 Å exhibiting optical transmissions greater than 80% and electrical resistivities varying from about 7–1000 ohms/square.

SUMMARY OF THE INVENTION

We have found that those objectives can be achieved through a modification in the conventional process for preparing metal oxide films. In brief, the inventive method comprises two fundamental steps:

(1) an atomized mist of the metal salt comprising the precursor of the desired metal oxide is sprayed into a chamber which is heated to a temperature sufficient to vaporize the atomized mist; and then (2) the hot fumes resulting are drawn into contact with the surface of a substrate which is at a temperature sufficient to thermally decompose the metal salt by exhaust (negative pressure) at the exit end of the chamber.

The chamber may be at a substantially uniform temperature throughout or there may be a thermal gradient therein. Thus, the zone of the chamber where the hot fumes are brought into contact with the surface of the substrate may be at a higher temperature than the zone thereof wherein the atomized mist is vaporized. In any event, the temperature at the exit end of the chamber will be essentially equivalent to that of the surface of the substrate in order to minimize any thermal gradient therebetween.

This two-stage method provides two features which promote the deposition of metal oxide films of exceptionally uniform thickness. First, thermal differentials set up between the hot substrate and the cool spray in the conventional pyrolysis process are eliminated. Second, because the mist has been converted into fumes before contacting the substrate, the extraction of heat from the substrate which is an inherent result of the pyrolysis reaction is minimized.

PRIOR ART

U.S. Pat. No. 3,331,702 discloses a method and apparati for carrying out the method for producing a metal oxide film on a thin vitreous substrate through pyrolysis of a metal salt. The method involved two basic steps:

First, forming within a confined space an atmosphere of quiescent vapors of a metal salt capable of pyrolyzing to produce a metal oxide deposit; and Second, simultaneously bringing said vapors into contact with a surface of the vitreous substrate utilizing convection currents generated within the confined atmosphere and supplying radiant heat to the opposite surface of the substrate to compensate for the heat loss due to the formation of the metal oxide film deposited on the surface of the substrate.

There is no discussion of a two-stage process wherein an atomized mist of a metal salt sprayed into a chamber is heated to a temperature sufficiently high to vaporize the mist, and those fumes are then forced down onto the surface of a substrate utilizing the negative pressure resulting from exhaust at the bottom of the chamber.

DESCRIPTION OF PREFERRED EMBODIMENTS

Figure 1:
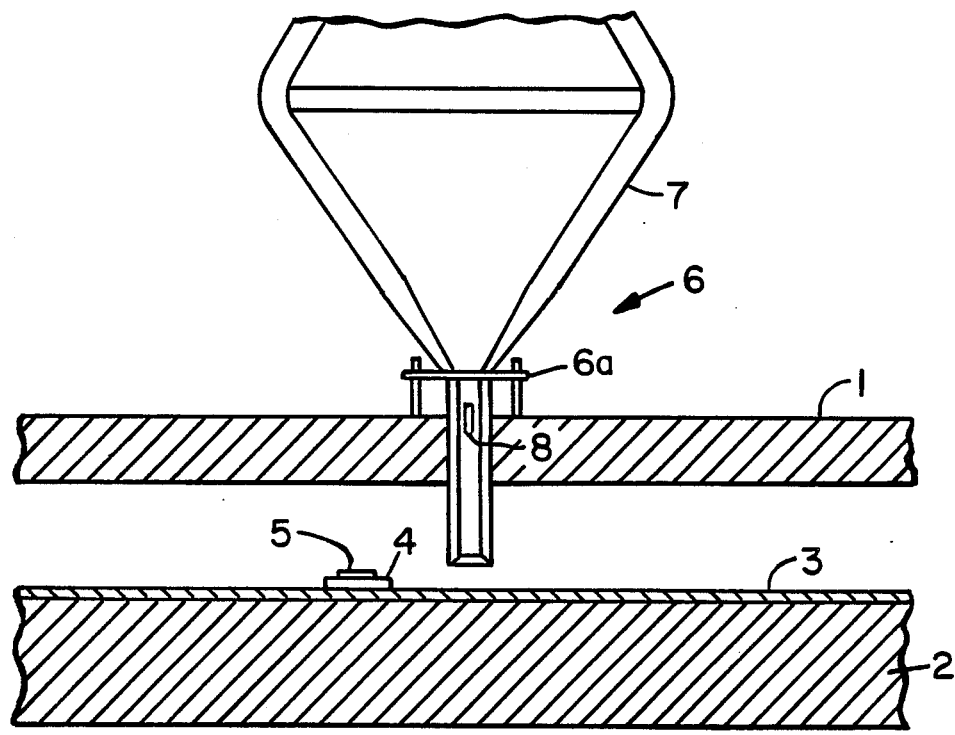
FIG. 1 is a schematic side elevation in cross section illustrating the overall coating facility including the fuming chamber.

FIG. 1 generally depicts the inventive hood fumer as being utilized in a particular application. As illustrated therein, 1 comprises the ceiling of a lehr, 2 constitutes the floor of a lehr, and 3 describes a metal belt which moves along 2 and carries pallet 4 with substrate 5 in the form of a glass sheet resting thereon. A fuming chamber generally defined in 6 extends through lehr ceiling 1 into close proximity to substrate 5 and is connected to an exhaust hood 7 through support structure 6A. An atomizing spray nozzle 8 is positioned in the top of chamber 6.

Figure 2:
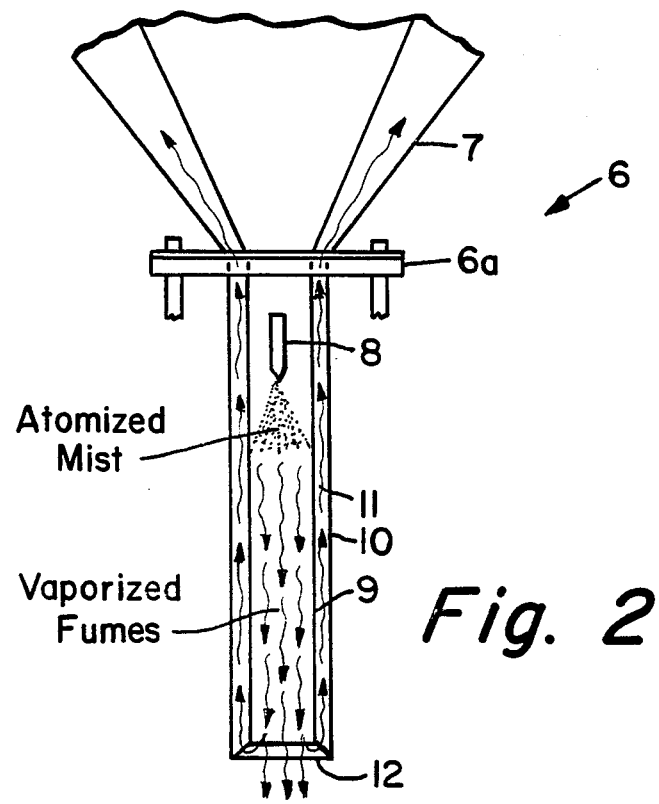
FIG. 2 is a schematic side elevation in cross section of the fuming chamber.

As pictured in FIG. 2, fuming chamber 6 consists of exhaust units 9 and 10 mounted in concentric relation to one another leaving passageway 11 therebetween with an exhaust opening 12 being located at the bottom thereof. In the embodiment of the invention illustrated in FIG. 1, chamber 6 will advantageously be fabricated from a metal resistant to fumes of the metal salt to be vaporized, e.g., a stainless steel. The use of metal enables heat from the lehr to be readily conducted through the walls of chamber 6, so that the temperature within chamber 6, at least in the lower portion thereof, will be essentially equivalent to that within the lehr. Because of the corrosiveness of the spraying solutions and the temperatures experienced in the operating environment, simple metal nozzles deteriorate quite rapidly. Therefore, exotic alloys such as tungsten-tantalum mixtures must be used which, because of the need for special machining, are very expensive. This had led to the use of nozzles fashioned from a glass such as Corning Code 7740 marketed by Corning Glass Works, Corning, N.Y.

In operation, a solution of metal salt(s) is atomized through nozzle 8 into the top portion of chamber 6 and the resulting mist is vaporized by the heat being radiated from the wall of chamber 6 as it is drawn down through chamber 6 by the negative pressure of exhaust being evacuated up through passageway 11 and out hood 7. As substrate 5 passes beneath chamber 6, the resultant fumes will deposit on the hot surface thereof with the excess fumes going back up through passageway 11 and out hood 7. The rate of movement of the hot fumes down through chamber 6 and onto substrate 5 must be carefully regulated to not only produce a uniform deposit on substrate 4, but also to avoid a large excess of fumes. Such an excess is wasteful economically and the fumes, themselves, may be corrosive of components of the coating facility and result in air pollution.

In the specific embodiments of the inventive method discussed hereinafter, antimony-doped tin oxide films were deposited utilizing a commercially-marketed solution for the preparation thereof. That solution is actually a mixture of an antimony chloride solution and a tin chloride solution. The antimony chloride solution results from dissolving one gram of $SbCl_3$ in 1 ml of a 1:1 solution of 37% HCl aqueous solution and distilled water. The tin chloride solution is prepared by dissolving one grame of $SnCl_4.5\ H_2O$ in 1 ml of a 1:5 solution of 30% HCl aqueous solution and distilled $H_2O$.

Samples of about 4"×4" were cut from Corning Code 0211 glass microsheet of optical quality marketed by Corning Glass Works, Corning, N.Y. having a thickness of about 0.030". The squares were placed on a pallet cut from Corning Code 9608 glass-ceramic sheet marketed by Corning Glass Works having dimensions of 12"×16"×0.25", the surface of which had been roughened through sandblasting to remove any surface patterns on the pallet which might create thermal gradients in the microsheet.

The pallet was then located on the lehr belt in the preheat zone of the lehr such that the glass squares would pass directly under the center of the fuming chamber and within about 0.5" of the bottom of that chamber. Once the lehr temperature was stabilized in the area of the fuming chamber, the lehr belt was actuated. Before the substrates passed under the fuming chamber, however, the air flow and solution flow to the nozzle were adjusted as was the air exhaust rate to insure that the system was stable by the time the substrates arrived under the fuming chamber. After the substrates are coated, the spraying nozzle can be turned off and removed from the fuming chamber to preclude overheating, particularly where a glass nozzle is employed, while the pallet moves to the exit end of the lehr.

Electrical resistivity, optical transmission, and thickness measurements were undertaken on the coated samples as described below.

(1) The surface resistance of the film was determined employing a probe consisting of two point contacts separated by a constant distance. A proportionality constant (K) is calculated by first measuring the surface resistance of a film of a known resistivity and then dividing the known resistivity by the surface resistance. Thus:

$$K = \frac{\text{Resistivity}}{\text{Surface Resistance}}$$

A good approximation of resistivity can be secured in this manner so long as the resistivity of the control film utilized in calculating the proportionality constant has a value which is relatively close to that of the film being tested.

(2) Optical transmission measurements were conducted using a J-16 digital photometer marketed by Techron Corporation, Randolph, Mass. The photometer was initially calibrated to 100% employing a source of white light and the percent transmission of each sample read by centering it in front of the phototube. The wavelength sensitivity of the photometer ranged from 4250–7000 Å with a peak at 5600 Å.

(3) The first step involved in determining the thickness of the deposited film was to mask off an area of the sample with beeswax. Thereafter, in an area of the sample adjacent to that covered by wax, etch off the deposit from the glass. (With the antimony-doped, tin oxide films, this etching was accomplished with an aqueous solution of zinc and HCl.) The result is a very good stepping edge for making the measurement utilizing a profilometer. A surfanalyzer capable of determining thicknesses of less than one microinch was used in measuring the film thicknesses recorded below.

To investigate the several variables affecting the characteristics of the deposited layers, the squares of microsheet were run through the lehr in a series of experiments wherein all of those variables except one were held constant. For example, in the first set of experiments, runs were made where the temperature of the lehr in the region of the fuming chamber was 575° C., 600° C., 615° C., and 630° C., respectively. The other variables were held constant as follows:

Belt speed: 13"/minute

Air exhaust: −0.5″ H$_2$O
Air flow rate through nozzle: 850 cubic centimeters per minute (cc/min)
Solution flow rate: 25.4 cubic centimeters per minute (cc/min)

The range of electrical resistivity measured on the specimens at each temperature is reported below:

| Temp. °C. | Resistivity (ohms/square) |
| --- | --- |
| 575 | 200–475 |
| 600 | 120–325 |
| 615 | 95–220 |
| 630 | 60–140 |

As can be readily observed, higher temperatures lead to lower resistivities. At 615° C., however, the microsheet squares evidenced signs of warping and at 630° C. the warping was significantly worse. (The softening point of Code 0211 glass is 720° C. and the annealing point 550° C.) Accordingly, the maximum safe temperature for applying the deposit was deemed to be about 600° C. Quite apparently, higher application temperatures can be employed with more refractory glass substrates; e.g., Corning Code 0317 glass has a softening point of 870° and an annealing point of 622° C., and Corning Code 7059 has a softening point of 844° C. and an annealing point of 639° C.

To evaluate the effect of lehr belt speed, samples were run at the rates set out below and the other variables were maintained constant at:
Lehr temperature in region of fuming chamber: 600° C.
Air exhaust rate: 0.5″ H$_2$O
Air flow rate: 850 cc/min
Solution flow rate: 25.4 cc/min The effect of belt speed upon the electrical resistivity of the deposited film is illustrated below:

| Belt Speed (inches/minute) | Resistivity (ohms/square) |
| --- | --- |
| 23.25 | 975 |
| 16.5 | 320 |
| 13.125 | 125 |
| 9 | 90 |

As can be seen, slower belt speeds produced films of lower resistivity. The films produced when the belt moved at 9 inches/minute, however, exhibited numerous surface defects which were determined to consist of unreacted SnCl$_4$ salt. Where the lehr belt is operating at slow speeds, the surface temperature of the microsheet substrate is decreased by the quantity of fumes contacting the surface and by the energy required for the reaction of the components. The resulting lower surface temperatures reduce the rate of reaction, thereby leaving surface spots of unreacted SnCl$_4$. Consequently, with the above-described assembly, it is apparent that the belt speed must be sufficiently rapid to avoid those surface defects. Therefore, a rate in excess of 10 inches/minute has been deemed appropriate where the other variables are held constant at the above levels.

The effect of air exhaust rate, as would be expected, is dependent upon the distance between the bottom of the fuming chamber and the surface of the microsheet substrate. In the work reported here, that distance was maintained at 0.5 inch and samples were run at the four rates tabulated below with the other variables being held at:
Lehr temperature in region of fuming chamber: 600° C.
Belt speed: 13″/minute
Air flow rate: 850 cc/min
Solution flow rate: 25.4 cc/min The effect of air exhaust rates upon the electrical resistivity exhibited by the films is demonstrated below:

| Air Exhaust Rate (inches of H$_2$O) | Resistivity (ohms/square) |
| --- | --- |
| −0.25 | 140 |
| −0.50 | 110 |
| −1.00 | 90 |
| −1.50 | — |

The exhaust rate of −0.25″ H$_2$O was not sufficient to remove all of the vapors from the fuming chamber. On the other hand, at an exhaust rate of −1.5″ H$_2$O the microsheet squares were lifted off the pallet and held in contact with the fuming chamber. Hence, under the above-recited conditions (including a span of 0.5″ between the substrates and the fuming chamber), an exhaust rate no greater than about −1.25″ H$_2$O can be used.

The next set of experiments was designed to discover the effect of air flow through the nozzle on the properties of the deposited film. The nozzle was fabricated from glass Corning Code 7740. In the following six runs at different air flows, the other variables were fixed at:
Lehr temperature in region of fuming chamber: 600°

Air exhaust rate: −1″ H$_2$O
Belt speed: 13″/minute
Solution flow rate: 25.4 cc/min The table below illustrates the effect which changes in air flow rate (at standard atmospheric temperature and pressure) have upon the electrical resistivity exhibited by the film:

| Air Flow (cc/min) | Resistivity (ohms/square) |
| --- | --- |
| 640 | 133 |
| 750 | 110 |
| 850 | 89 |
| 960 | 109 |
| 1070 | 120 |
| 1170 | 145 |

Care must be taken in controlling the air flow since the velocity thereof must be great enough to act in conjunction with the air exhaust rate to carry the fumes to the surface of the substrate, but not so great as to cool the fumes to such an extent to adversely affect the rate of reaction. It will be appreciated that variations in the size of the nozzle orifice can have a profound effect upon the optimum air flow rate.

Finally, a set of five experiments was designed to investigate the effect of solution flow through the nozzle on the characteristics of the deposited layer.

The same nozzle was employed as that used above in the determination of the effect of air flow on film properties. The substrate glass was Corning Code 0317. In the following five runs at different solution flow rates (at standard atmospheric temperature and pressure), the remaining variables were maintained at:

Lehr temperature in region of fuming chamber: 600° C.
Belt speed: 13"/minute
Air exhaust rate: −1" $H_2O$
Air flow rate: 850 cc/min The table below reports values of electrical resistivity, thickness, and optical transmission measured on the samples. The white light used in the transmission measurements had a maximum transmission at a wavelength of 5600 Å.

| Sample No. | Solution Flow Rate (cc/min) | Resistivity (ohms/square) | Thickness (Å) | Transmission (%) |
| --- | --- | --- | --- | --- |
| 1 | 16.7 | 450 | 1145 | 83.5 |
| 2 | 16.7 | 325 | 1145 | 83.6 |
| 3 | 19.6 | 150 | 1460 | 89.8 |
| 4 | 19.6 | 160 | 1420 | 88.6 |
| 5 | 22.6 | 125 | 1650 | 92.1 |
| 6 | 22.6 | 120 | 1610 | 90.3 |
| 7 | 25.4 | 89 | 1890 | 88.4 |
| 8 | 25.4 | 74 | 2070 | 86.5 |
| 9 | 28.8 | 58 | 2475 | 83.0 |
| 10 | 28.8 | 60 | 2555 | 82.9 |

As can be observed in that table, as the resistivity of the films decreases, the thickness thereof appears to increase at an exponential rate. Also, there appears to be a transmission peak at a thickness of about 1700 Å and a minimum at about 2500 Å.

The effect of wavelength on the transmission of the deposited film was also studied on three different samples. The table below records the results of those tests.

| Sample No. | Film Thickness (Å) | Resistivity (ohms/square) | Transmission Observations |
| --- | --- | --- | --- |
| 1 | 1510 | 120 | Maximum at ~5500Å |
| 2 | 1890 | 89 | Minimum at ~4700Å |
| 3 | 2070 | 74 | Minimum at ~5000Å |

The mechanism underlying the changes in optical transmission exhibited at different wavelengths involves interference effects in thin films having refractive indices differing from those of the glass substrates.

In summary, the amount of solution applied to the substrate is primarily a function of the rate at which the solution is atomized out of the nozzle. However, the amount applied is also affected to a lesser or greater extent by the air exhaust rate, the belt speed of the lehr, and the height of the fuming chamber above the substrate. The principal means for controlling the temperature of the substrate is to regulate the temperature of the lehr. Nevertheless, as has been demonstrated above, the substrate temperature may also be affected by the belt speed of the lehr, the volume of air and/or solution being sprayed into the fuming chamber, and the air exhaust rate. The temperature of the fumes brought into contact with the substrate is mainly dependent upon the temperature of the lehr, but is secondarily affected by the distance from the nozzle to the substrate and the temperature and flow rate of the air passing through the nozzle. Furthermore, film properties can also vary with the glass composition of the substrate, since ions from the glass may migrate into the film during the reaction. Finally, the above description is directed to a single exposure to fumes from the fuming chamber. It will be appreciated that varying optical transmissions, thicknesses, and electrical resistivities can be obtained in films developed through multiple exposures. In particular, films exhibiting electrical resistivities lower than 7 ohms/square can be conceived, but with some sacrifice in optical transmission, with multiple layers.

We claim:

1. A method for preparing a thin, transparent metal oxide film of exacting uniform thickness through the pyrolysis of at least one metal salt which comprises the steps of:
    (a) spraying an atomized mist of said metal salt into a fuming chamber heated to a temperature sufficient to vaporize said mist;
    (b) drawing the resultant fumes out of said chamber into contact with the surface of a substrate which is at a temperature essentially equivalent to that of said fumes at the exit end of said chamber, said fumes being drawn out of said chamber by negative pressure at the exit end thereof and said temperature being sufficient to thermally decompose said metal salt and deposit a film of metal oxide and said substrate.

2. A method according to claim 1 wherein said metal oxide film consists of antimony-doped tin oxide.

3. A method according to claim 2 wherein said film has a thickness between about 1000–3000 Å, an optical transmission greater than 80%, and a electrical resistivity between about 7–1000 ohms/square.

4. A method according to claim 1 wherein said substrate is a glass body.

* * * * *